US010259555B2

(12) United States Patent
Ward et al.

(10) Patent No.: US 10,259,555 B2
(45) Date of Patent: Apr. 16, 2019

(54) METHODS FOR CONTROLLING MOVEMENT OF A MARINE VESSEL NEAR AN OBJECT

(71) Applicant: Brunswick Corporation, Lake Forest, IL (US)

(72) Inventors: Aaron J. Ward, Oshkosh, WI (US); Michael J. Lemancik, Fond Du Lac, WI (US)

(73) Assignee: Brunswick Corporation, Mettawa, IL (US)

( * ) Notice: Subject to any disclaimer, the term of this patent is extended or adjusted under 35 U.S.C. 154(b) by 310 days.

(21) Appl. No.: 15/246,681

(22) Filed: Aug. 25, 2016

(65) Prior Publication Data

US 2018/0057132 A1 Mar. 1, 2018

(51) Int. Cl.
*B63H 21/21* (2006.01)
*B63H 25/42* (2006.01)
(Continued)

(52) U.S. Cl.
CPC ........... *B63H 21/21* (2013.01); *B63H 21/213* (2013.01); *B63H 25/42* (2013.01); *G05D 1/0206* (2013.01);
(Continued)

(58) Field of Classification Search
CPC .. B63H 21/21; B63H 25/42; B63H 2021/216; G08G 3/02; G05D 1/0206; B63J 2099/006
See application file for complete search history.

(56) References Cited

U.S. PATENT DOCUMENTS 2,585,502 A 2/1952 Schneider
2,775,328 A 12/1956 Yokel
(Continued)

FOREIGN PATENT DOCUMENTS

DE 906907 C 3/1954
EP 0423901 A1 4/1991
(Continued)

OTHER PUBLICATIONS

Japanese Office Action issued in corresponding JP Application No. 2017-124673 dated Oct. 10, 2017.
(Continued)

*Primary Examiner* — Stephen Holwerda
(74) *Attorney, Agent, or Firm* — Andrus Intellectual Property Law, LLP

(57) ABSTRACT

A method for controlling movement of a marine vessel near an object includes accepting a signal representing a desired movement of the marine vessel from a joystick. A sensor senses a shortest distance between the object and the marine vessel and a direction of the object with respect to the marine vessel. A controller compares the desired movement of the marine vessel with the shortest distance and the direction. Based on the comparison, the controller selects whether to command the marine propulsion system to generate thrust to achieve the desired movement, or alternatively whether to command the marine propulsion system to generate thrust to achieve a modified movement that ensures the marine vessel maintains at least a predetermined range from the object. The marine propulsion system then generates thrust to achieve the desired movement or the modified movement, as commanded.

20 Claims, 6 Drawing Sheets

(51) Int. Cl.
  *G05D 1/02* (2006.01)
  *G08G 3/02* (2006.01)
  *B63J 99/00* (2009.01)
  *B63H 20/00* (2006.01)

(52) U.S. Cl.
  CPC .......... *G08G 3/02* (2013.01); *B63H 2020/003* (2013.01); *B63H 2021/216* (2013.01); *B63J 2099/006* (2013.01)

(56) References Cited

U.S. PATENT DOCUMENTS

| | | |
|---|---|---|
| 3,187,704 A | 6/1965 | Shatto et al. |
| 3,673,553 A | 6/1972 | Miura et al. |
| 3,688,252 A | 8/1972 | Thompson |
| 3,707,717 A | 12/1972 | Frielinghaus |
| 3,715,571 A | 2/1973 | Braddon |
| 3,771,483 A | 11/1973 | Spencer |
| 4,009,678 A | 3/1977 | North |
| 4,220,111 A | 9/1980 | Krautkremer et al. |
| 4,253,149 A | 2/1981 | Cunningham et al. |
| 4,428,052 A | 1/1984 | Robinson et al. |
| 4,513,378 A | 4/1985 | Antkowiak |
| 4,519,335 A | 5/1985 | Krautkremer et al. |
| 4,691,659 A | 9/1987 | Ito et al. |
| 4,769,773 A | 9/1988 | Shatto, Jr. |
| 4,939,661 A | 7/1990 | Barker et al. |
| 4,975,709 A | 12/1990 | Koike |
| 5,031,561 A | 7/1991 | Nilsson |
| 5,090,929 A | 2/1992 | Rieben |
| 5,108,325 A | 4/1992 | Livingston et al. |
| 5,172,324 A | 12/1992 | Knight |
| 5,202,835 A | 4/1993 | Knight |
| 5,331,558 A | 7/1994 | Hossfield et al. |
| 5,362,263 A | 11/1994 | Petty |
| 5,386,368 A | 1/1995 | Knight |
| 5,390,125 A | 2/1995 | Sennott et al. |
| 5,491,636 A | 2/1996 | Robertson et al. |
| 5,735,718 A | 4/1998 | Ekwall |
| 5,736,962 A | 4/1998 | Tendler |
| 5,755,605 A | 5/1998 | Asberg |
| 5,884,213 A | 3/1999 | Carlson |
| 6,059,226 A | 5/2000 | Cotton et al. |
| 6,092,007 A | 7/2000 | Cotton et al. |
| 6,142,841 A | 11/2000 | Alexander, Jr. et al. |
| 6,230,642 B1 | 5/2001 | McKenney et al. |
| 6,234,853 B1* | 5/2001 | Lanyi ................. B63H 21/213 114/144 R |
| 6,273,771 B1 | 8/2001 | Buckley et al. |
| 6,308,651 B2 | 10/2001 | McKenney et al. |
| 6,354,892 B1 | 3/2002 | Staerzl |
| 6,357,375 B1 | 3/2002 | Ellis |
| 6,377,889 B1 | 4/2002 | Soest |
| 6,386,930 B2 | 5/2002 | Moffet |
| 6,431,928 B1 | 8/2002 | Aarnivuo |
| 6,446,003 B1 | 9/2002 | Green et al. |
| 6,447,349 B1 | 9/2002 | Fadeley et al. |
| 6,485,341 B1 | 11/2002 | Layni et al. |
| 6,511,354 B1 | 1/2003 | Gonring et al. |
| 6,604,479 B2 | 8/2003 | McKenney et al. |
| 6,623,320 B1 | 9/2003 | Hedlund |
| 6,677,889 B2 | 1/2004 | Van Rees et al. |
| 6,678,589 B2 | 1/2004 | Robertson et al. |
| 6,705,907 B1 | 3/2004 | Hedlund |
| 6,707,414 B2 | 3/2004 | Van Rees et al. |
| 6,712,654 B1 | 3/2004 | Puaansuu |
| 6,757,606 B1 | 6/2004 | Gonring |
| 6,848,382 B1 | 2/2005 | Bekker |
| 6,978,729 B2 | 12/2005 | Bertetti et al. |
| 6,994,046 B2 | 2/2006 | Kaji et al. |
| 6,995,527 B2 | 2/2006 | Depasqua |
| RE39,032 E | 3/2006 | Gonring et al. |
| 7,131,385 B1 | 11/2006 | Ehlers et al. |
| 7,220,153 B2 | 5/2007 | Ehlers et al. |
| 7,261,605 B2 | 8/2007 | Misao et al. |
| 7,267,068 B2 | 9/2007 | Bradley et al. |
| 7,268,703 B1 | 9/2007 | Kabel et al. |
| 7,305,928 B2 | 12/2007 | Bradley et al. |
| 7,366,593 B2 | 4/2008 | Fujimoto et al. |
| 7,389,735 B2 | 6/2008 | Kaji et al. |
| 7,398,742 B1 | 7/2008 | Gonring |
| 7,416,458 B2 | 8/2008 | Suemori et al. |
| 7,429,202 B2 | 9/2008 | Yazaki et al. |
| 7,455,557 B2 | 12/2008 | Lanyi et al. |
| 7,467,595 B1 | 12/2008 | Lanyi et al. |
| 7,476,134 B1 | 1/2009 | Fell et al. |
| 7,538,511 B2 | 5/2009 | Samek |
| 7,561,886 B1 | 7/2009 | Gonring et al. |
| 7,577,526 B2 | 8/2009 | Kim et al. |
| 7,727,036 B1 | 6/2010 | Poorman et al. |
| 7,813,844 B2 | 10/2010 | Gensler et al. |
| 7,876,430 B2 | 1/2011 | Montgomery |
| 7,883,383 B2 | 2/2011 | Larsson |
| 8,050,630 B1 | 11/2011 | Arbuckle |
| 8,082,100 B2 | 12/2011 | Grace et al. |
| 8,145,370 B2 | 3/2012 | Borrett |
| 8,145,371 B2 | 3/2012 | Rae et al. |
| 8,155,811 B2 | 4/2012 | Noffsinger et al. |
| 8,215,252 B1 | 7/2012 | Chun |
| 8,265,812 B2 | 9/2012 | Pease |
| 8,417,399 B2 | 4/2013 | Arbuckle et al. |
| 8,439,800 B1 | 5/2013 | Bazan et al. |
| 8,478,464 B2 | 7/2013 | Arbuckle et al. |
| 8,480,445 B2 | 7/2013 | Morvillo |
| 8,510,028 B2 | 8/2013 | Grace et al. |
| 8,515,660 B2 | 8/2013 | Grace et al. |
| 8,515,661 B2 | 8/2013 | Grace et al. |
| 8,527,192 B2 | 9/2013 | Grace et al. |
| 8,543,324 B2 | 9/2013 | Grace et al. |
| 8,622,778 B2 | 1/2014 | Tyers et al. |
| 8,645,012 B2 | 2/2014 | Salmon et al. |
| 8,694,248 B1 | 4/2014 | Arbuckle et al. |
| 8,761,976 B2 | 6/2014 | Salmon et al. |
| 8,777,681 B1 | 7/2014 | McNalley et al. |
| 8,797,141 B2 | 8/2014 | Best et al. |
| 8,807,059 B1 | 8/2014 | Samples et al. |
| 8,831,868 B2 | 9/2014 | Grace et al. |
| 8,924,054 B1 | 12/2014 | Arbuckle et al. |
| 9,039,468 B1 | 5/2015 | Arbuckle et al. |
| 9,114,865 B1 | 8/2015 | Gonring |
| 9,132,900 B2 | 9/2015 | Salmon et al. |
| 9,132,903 B1 | 9/2015 | Gable et al. |
| 9,162,743 B2 | 10/2015 | Grace et al. |
| 9,176,215 B2 | 11/2015 | Nikitin et al. |
| 9,195,234 B2 | 11/2015 | Stephens |
| 9,248,898 B1 | 2/2016 | Kirchhoff |
| 9,359,057 B1 | 6/2016 | Andrasko et al. |
| 9,377,780 B1 | 6/2016 | Arbuckle et al. |
| 9,676,464 B2 | 6/2017 | Johnson et al. |
| 9,694,885 B2 | 7/2017 | Combee |
| 9,733,645 B1 | 8/2017 | Andrasko et al. |
| 9,904,293 B1 | 2/2018 | Heap et al. |
| 9,927,520 B1 | 3/2018 | Ward et al. |
| 2003/0137445 A1* | 7/2003 | Van Rees .................. B63C 1/04 342/41 |
| 2003/0191562 A1 | 10/2003 | Robertson |
| 2004/0221787 A1 | 11/2004 | McKenney et al. |
| 2005/0170713 A1 | 8/2005 | Okuyama |
| 2006/0089794 A1 | 4/2006 | Despasqua |
| 2006/0116796 A1 | 6/2006 | Fossen et al. |
| 2007/0017426 A1* | 1/2007 | Kaji .................. B63H 25/42 114/144 RE |
| 2007/0032923 A1 | 2/2007 | Mossman et al. |
| 2007/0068438 A1* | 3/2007 | Mizutani ................ B63H 20/10 114/144 R |
| 2007/0089660 A1 | 4/2007 | Bradley |
| 2007/0162207 A1 | 7/2007 | Shimo et al. |
| 2007/0178779 A1 | 8/2007 | Takada et al. |
| 2007/0203623 A1 | 8/2007 | Saunders et al. |
| 2007/0233389 A1 | 10/2007 | Stephens |
| 2008/0033603 A1 | 2/2008 | Gensler et al. |
| 2008/0289558 A1 | 11/2008 | Montgomery |
| 2009/0037040 A1 | 2/2009 | Salmon et al. |
| 2009/0171520 A1 | 7/2009 | Kaji |

(56) References Cited

U.S. PATENT DOCUMENTS

| | | | |
|---|---|---|---|
| 2009/0276148 A1 | 11/2009 | Ardvisson | |
| 2010/0023192 A1 | 1/2010 | Rae et al. | |
| 2010/0076683 A1* | 3/2010 | Chou | B60R 1/00 701/301 |
| 2010/0109944 A1 | 5/2010 | Whitehead et al. | |
| 2010/0138083 A1 | 6/2010 | Kaji | |
| 2010/0145558 A1 | 6/2010 | Kaji | |
| 2011/0153126 A1 | 6/2011 | Arbuckle et al. | |
| 2011/0166724 A1 | 7/2011 | Hiramatsu | |
| 2012/0072059 A1* | 3/2012 | Glaeser | B63B 43/18 701/21 |
| 2012/0129410 A1 | 5/2012 | Tyers | |
| 2012/0248259 A1 | 10/2012 | Page et al. | |
| 2013/0080044 A1 | 3/2013 | Tyers et al. | |
| 2013/0297104 A1 | 11/2013 | Tyers et al. | |
| 2015/0089427 A1 | 3/2015 | Akuzawa | |
| 2015/0277442 A1 | 10/2015 | Ballou | |
| 2015/0346722 A1 | 12/2015 | Herz et al. | |
| 2015/0346730 A1 | 12/2015 | Stephens et al. | |
| 2016/0101838 A1 | 4/2016 | Kojima | |
| 2016/0125739 A1 | 5/2016 | Stewart et al. | |
| 2016/0246300 A1 | 8/2016 | Langford-Wood | |
| 2016/0252907 A1 | 9/2016 | Parkinson | |
| 2016/0334792 A1 | 11/2016 | Jopling | |
| 2017/0205828 A1 | 7/2017 | Estabrook | |
| 2017/0205829 A1 | 7/2017 | Tyers | |
| 2017/0210449 A1 | 7/2017 | Frisbie et al. | |
| 2017/0253314 A1 | 9/2017 | Ward | |
| 2017/0255200 A1 | 9/2017 | Arbuckle et al. | |
| 2017/0255201 A1 | 9/2017 | Arbuckle et al. | |
| 2017/0277189 A1 | 9/2017 | Johnson et al. | |
| 2017/0349257 A1 | 12/2017 | Hara et al. | |
| 2017/0365175 A1 | 12/2017 | Harnett | |
| 2018/0015994 A1 | 1/2018 | Kishimoto et al. | |

FOREIGN PATENT DOCUMENTS

| | | |
|---|---|---|
| EP | 2161542 A1 | 3/2010 |
| GB | 1173442 A | 12/1969 |
| GB | 2180374 A | 3/1987 |
| JP | S58061097 A | 4/1983 |
| JP | H04101206 A | 2/1992 |
| JP | 05-203638 A | 8/1993 |
| JP | H07223591 A | 8/1995 |
| JP | 2926533 B2 | 7/1997 |
| JP | 11-129978 A | 5/1999 |
| JP | 2002173091 A | 6/2002 |
| JP | 2003276677 A | 10/2003 |
| JP | 2006137309 A | 6/2006 |
| JP | 2007248336 A | 9/2007 |
| JP | 2008201225 A | 9/2008 |
| JP | 2009227035 A | 10/2009 |
| JP | 2009-538782 A | 11/2009 |
| JP | 2011128943 A | 6/2011 |
| JP | 5042906 B2 | 7/2012 |
| JP | 2012528417 A | 11/2012 |
| JP | 5226355 B2 | 7/2013 |
| JP | 2014065495 A | 4/2014 |
| KR | 20060072293 A | 6/2006 |
| WO | WO 1992005505 A1 | 4/1992 |
| WO | WO 2006058400 A1 | 6/2006 |
| WO | WO 2008111249 A1 | 8/2008 |
| WO | 2016104031 A1 | 6/2016 |

OTHER PUBLICATIONS

Japanese Office Action issued in corresponding JP Application No. 2017-124673 dated Feb. 28, 2018.

Ward, Aaron, "Marine Vessel Station Keeping Systems and Methods," Unpublished U.S. Appl. No. 15/138,860, filed Apr. 26, 2016.

Poorman et al., "Multilayer Control System and Method for Controlling Movement of a Marine Vessel", U.S. Appl. No. 11/965,583, filed Dec. 27, 2007.

Ward et al., "Methods for Controlling Movement of a Marine Vessel Near and Object," Unpublished U.S. Appl. No. 15/986,395, filed May 22, 2018.

Arbuckle et al., "System and Method for Controlling a Position of a Marine Vessel Near an Object," Unpublished U.S. Appl. No. 15/818,233, filed Nov. 20, 2017.

Arbuckle et al., "System and Method for Controlling a Position of a Marine Vessel Near an Object," Unpublished U.S. Appl. No. 15/818,226, filed Nov. 20, 2017.

* cited by examiner

METHODS FOR CONTROLLING MOVEMENT OF A MARINE VESSEL NEAR AN OBJECT

FIELD

The present disclosure relates to systems and methods for controlling movement of a marine vessel in a body of water.

BACKGROUND

U.S. Pat. No. 6,234,853, which is hereby incorporated by reference in entirety, discloses a docking system that utilizes the marine propulsion unit of a marine vessel, under the control of an engine control unit that receives command signals from a joystick or push button device, to respond to a maneuver command from the marine operator. The docking system does not require additional propulsion devices other than those normally used to operate the marine vessel under normal conditions. The docking or maneuvering system of the present invention uses two marine propulsion units to respond to an operator's command signal and allows the operator to select forward or reverse commands in combination with clockwise or counterclockwise rotational commands either in combination with each other or alone U.S. Pat. No. 6,273,771, which is hereby incorporated by reference in entirety, discloses a control system for a marine vessel that incorporates a marine propulsion system that can be attached to a marine vessel and connected in signal communication with a serial communication bus and a controller. A plurality of input devices and output devices are also connected in signal communication with the communication bus and a bus access manager, such as a CAN Kingdom network, is connected in signal communication with the controller to regulate the incorporation of additional devices to the plurality of devices in signal communication with the bus whereby the controller is connected in signal communication with each of the plurality of devices on the communication bus. The input and output devices can each transmit messages to the serial communication bus for receipt by other devices.

U.S. Pat. No. 7,267,068, which is hereby incorporated by reference in entirety, discloses a marine vessel that is maneuvered by independently rotating first and second marine propulsion devices about their respective steering axes in response to commands received from a manually operable control device, such as a joystick. The marine propulsion devices are aligned with their thrust vectors intersecting at a point on a centerline of the marine vessel and, when no rotational movement is commanded, at the center of gravity of the marine vessel. Internal combustion engines are provided to drive the marine propulsion devices. The steering axes of the two marine propulsion devices are generally vertical and parallel to each other. The two steering axes extend through a bottom surface of the hull of the marine vessel.

U.S. Pat. No. 7,305,928, which is hereby incorporated by reference in entirety, discloses a vessel positioning system that maneuvers a marine vessel in such a way that the vessel maintains its global position and heading in accordance with a desired position and heading selected by the operator of the marine vessel. When used in conjunction with a joystick, the operator of the marine vessel can place the system in a station keeping enabled mode and the system then maintains the desired position obtained upon the initial change in the joystick from an active mode to an inactive mode. In this way, the operator can selectively maneuver the marine vessel manually and, when the joystick is released, the vessel will maintain the position in which it was at the instant the operator stopped maneuvering it with the joystick.

SUMMARY

This Summary is provided to introduce a selection of concepts that are further described below in the Detailed Description. This Summary is not intended to identify key or essential features of the claimed subject matter, nor is it intended to be used as an aid in limiting the scope of the claimed subject matter.

According to one example of the present disclosure, a method controls movement of a marine vessel near an object, the marine vessel being propelled by thrust generated by a marine propulsion system according to commands from a controller. The method comprises accepting, with the controller, a signal representing a desired movement of the marine vessel from a desired movement operational section. The controller resolves the desired movement of the marine vessel into a target linear thrust and a target moment about a preselected point on the marine vessel and determines a magnitude and a direction of a thrust vector of the marine propulsion system that will result in achievement of the target linear thrust and the target moment about the preselected point on the marine vessel. A sensor senses a shortest distance between the object and the marine vessel and a direction of the object with respect to the marine vessel. The controller compares the shortest distance between the object and the marine vessel to a predetermined range. In response to the marine vessel being within the predetermined range of the object, the controller automatically nullifies any vector components of the thrust vector that would otherwise cause net thrust in the direction of the object.

Another method for controlling movement of a marine vessel near an object is also disclosed. The method includes accepting, with a controller, a signal representing a desired movement of the marine vessel from a joystick. A sensor senses a shortest distance between the object and the marine vessel and a direction of the object with respect to the marine vessel. The controller compares the desired movement of the marine vessel with the shortest distance and the direction. Based on the comparison, the controller selects whether to command the marine propulsion system to generate thrust to achieve the desired movement, or alternatively whether to command the marine propulsion system to generate thrust to achieve a modified movement that ensures the marine vessel maintains at least a predetermined range from the object. The marine propulsion system then generates thrust to achieve the desired movement or the modified movement, as commanded.

BRIEF DESCRIPTION OF DRAWINGS

Examples of systems and methods for controlling movement of a marine vessel are described with reference to the following Figures. The same numbers are used throughout the Figures to reference like features and like components.

DETAILED DESCRIPTION OF DRAWINGS

In the present description, certain terms have been used for brevity, clarity, and understanding. No unnecessary limitations are to be implied therefrom beyond the requirement of the prior art because such terms are used for descriptive purposes only and are intended to be broadly construed. The different systems and methods described herein may be used alone or in combination with other systems and methods. Various equivalents, alternatives, and modifications are possible within the scope of the appended claims. Each limitation in the appended claims is intended to invoke interpretation under 35 USC § 112(f), only if the terms "means for" or "step for" are explicitly recited in the respective limitation.

Figure 1:
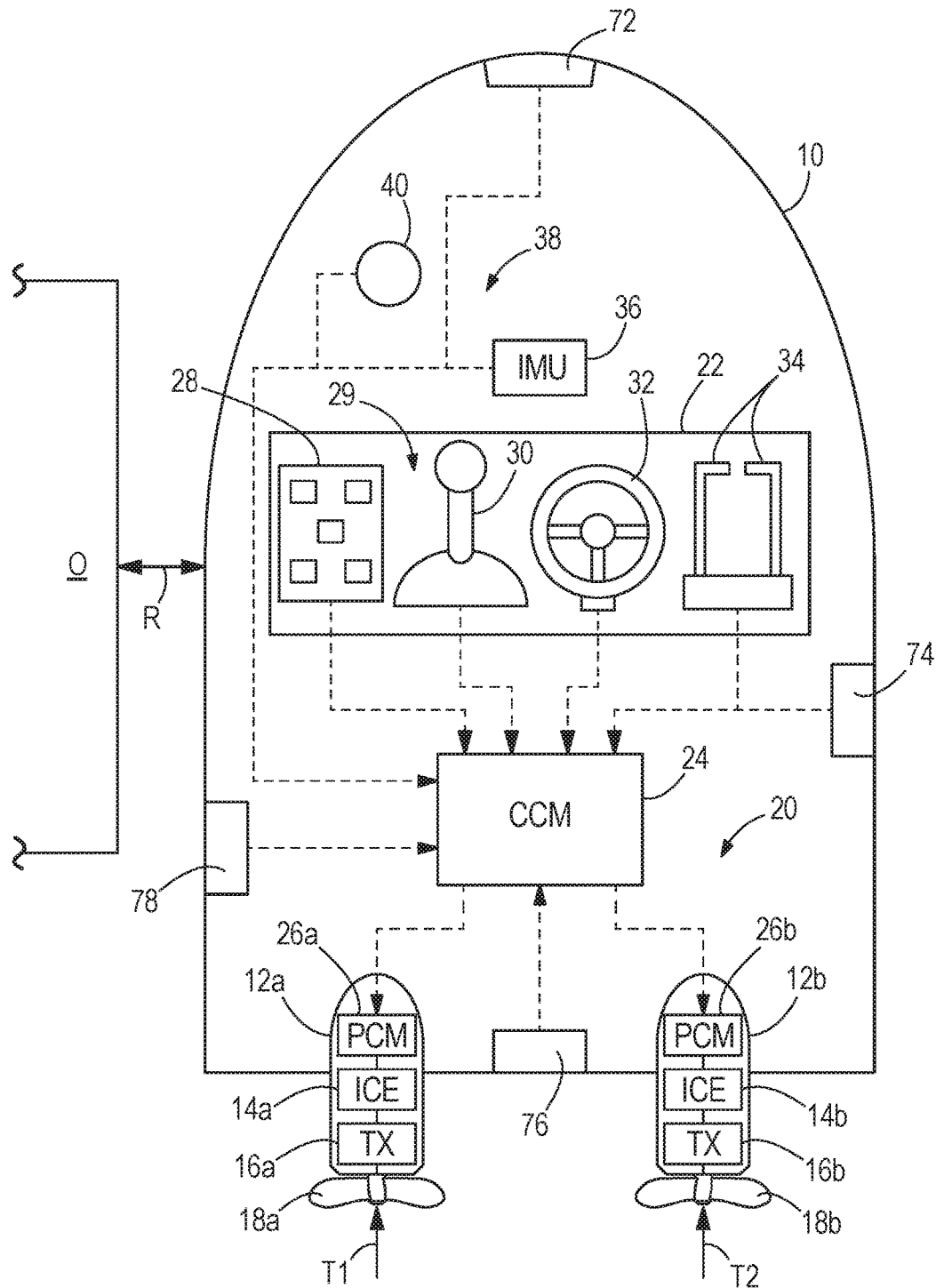
FIG. 1 is a schematic representation of a control system on a marine vessel.

FIG. 1 shows a marine vessel 10. The marine vessel 10 is capable of operating, for example, in a normal operating mode, a waypoint tracking mode, an auto heading mode, a station keeping mode, and a joysticking mode, among other modes, as described herein below. The marine vessel 10 has first and second propulsion devices 12a, 12b that produce first and second thrusts T1, T2 to propel the marine vessel 10, as will be more fully described herein below. As illustrated, the first and second propulsion devices 12a, 12b are outboard motors, but they could alternatively be inboard motors, stern drives or pod drives. Each propulsion device is provided with an engine 14a, 14b operatively connected to a transmission 16a, 16b, in turn operatively connected to a propeller 18a, 18b.

The marine vessel 10 also includes various control elements that make up a marine propulsion system 20. The marine propulsion system 20 comprises an operation console 22 in signal communication, for example via a CAN bus as described in U.S. Pat. No. 6,273,771, with a controller 24, such as for example a command control module (CCM), and with propulsion control modules (PCM) 26a, 26b associated with the respective propulsion devices 12a, 12b. Each of the controller 24 and the PCMs 26a, 26b may include a memory and a programmable processor. As is conventional, the processor can be communicatively connected to a computer readable medium that includes volatile or nonvolatile memory upon which computer readable code is stored. The processor can access the computer readable code, and the computer readable medium upon executing the code carries out functions as described herein below. In other examples of the system 20, only one controller is provided for the system rather than having both a CCM and PCMs. In other examples, one CCM is provided for each propulsion device, and/or additional control modules are provided for controlling engine speed and functions separately from steering and trim of the propulsion devices. For example, the PCMs 26a, 26b may control the engines 14a, 14b and transmissions 16a, 16b of the propulsion devices 12a, 12b, while additional thrust vector modules (TVMs) may control their orientation. In other examples of the system 20, the vessel control elements are connected via wireless communication rather than by a serially wired CAN bus. It should be noted that the dashed lines shown in FIG. 1 are meant to show only that the various control elements are capable of communicating with one another, and do not represent actual wiring connecting the control elements, nor do they represent the only paths of communication between the elements.

The operation console 22 includes a number of user input devices, such as a keypad 28, a joystick 30, a steering wheel 32, and one or more throttle/shift levers 34. Each of these devices inputs commands to the controller 24. The controller 24 in turn communicates with the first and second propulsion devices 12a, 12b by communicating with the PCMs 26a, 26b. The controller 24 also receives information from an inertial measurement unit (IMU) 36. The IMU 36 comprises a portion of a global positioning system (GPS) 38 which, in the example shown, also comprises a GPS receiver 40 located at a pre-selected fixed position on the marine vessel 10, which provides information related to the global position of the marine vessel 10. Signals from the GPS receiver 40 and the IMU 36 are provided to the controller 24. In one example, the IMU 36 can be a solid state, rate gyro electronic compass that detects the direction of the earth's magnetic field using solid state magnetometers and indicates the marine vessel heading relative to magnetic north.

The steering wheel 32 and the throttle/shift levers 34 function in the conventional manner, such that rotation of the steering wheel 32 for example activates a transducer that provides a signal to the controller 24 regarding a desired direction of the marine vessel 10. The controller 24 in turn sends signals to the PCMs 26a, 26b (and/or TVMs or additional modules if provided), which in turn activate steering actuators to achieve desired orientations of the propulsion devices 12a, 12b. The propulsion devices 12a, 12b are independently steerable about their steering axes. The throttle/shift levers 34 send signals to the controller 24 regarding the desired gear (forward, reverse, or neutral) of the transmissions 16a, 16b and the desired rotational speed of the engines 14a, 14b of the propulsion devices 12a, 12b. The controller 24 in turn sends signals to the PCMs 26a, 26b, which in turn activate electromechanical actuators in the transmissions 16a, 16b and engines 14a, 14b for shift and throttle, respectively. A manually operable control device, such as the joystick 30, can also be used to provide signals to the controller 24. The joystick 30 can be used to allow the operator of the marine vessel 10 to manually maneuver the marine vessel 10, such as to achieve translation or rotation of the marine vessel 10, as will be described below. It should be understood that in alternative examples, the various components 28, 30, 32, 34 may communicate directly with the PCMs 26a, 26b or may communicate with one or more central controllers.

Figure 2:
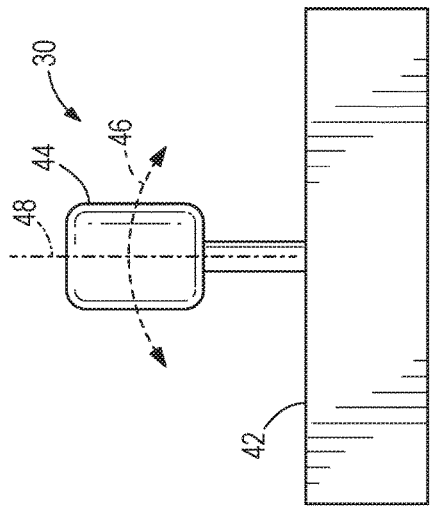
FIG. 2 is a side view of a joystick used in conjunction with the marine vessel of the present disclosure.
Figure 3:
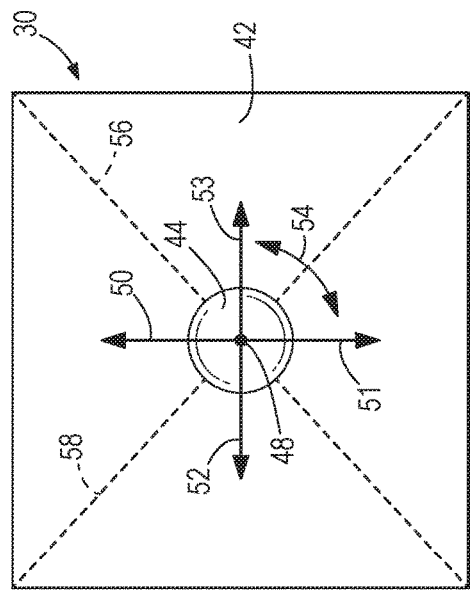
FIG. 3 is a top view of the joystick.

Referring to FIGS. 2 and 3, operation of the joystick 30 will now be described. FIG. 2 is a simplified schematic representation of the joystick 30 which provides a manually operable control device which can be used to provide a signal that is representative of a desired movement, selected by an operator, of the marine vessel 10. The example in FIG. 2 shows a base portion 42 and a handle 44 which can be manipulated by hand. In a typical application, the handle 44 is movable in the direction generally represented by arrow 46 and is also rotatable about an axis 48. It should be understood that the joystick handle 44 is movable by tilting it about its connection point in the base portion 42 in virtually any direction. Although arrow 46 is illustrated in the plane of the drawing in FIG. 2, a similar type of movement is possible in other directions that are not parallel to the plane of the drawing.

FIG. 3 is a top view of the joystick 30. The handle 44 can move, as indicated by arrow 46 in FIG. 2, in various directions which include those represented by arrows 50, 51, 52 and 53. However, it should be understood that the handle 44 can move in any direction relative to its axis 48 and is not limited to the two lines of movement represented by arrows 50, 51, 52 and 53. In fact, the movement of the handle 44 has a virtually infinite number of possible paths as it is tilted about its connection point within the base portion 42. The handle 44 is also rotatable about axis 48, as represented by arrow 54. Note that there are many different types of joystick devices that can be used to provide a signal that is representative of a desired movement of the marine vessel 10, as expressed by the operator of the marine vessel through movement of the handle 44. For example, a keypad, track ball, and/or other similar input device that allows inputs in four or more directions could be used.

With continued reference to FIG. 3, it can be seen that the operator can demand a purely linear movement either toward port as represented by arrow 52 or starboard as represented by arrow 53, a purely linear movement in a forward direction as represented by arrow 50 or reverse direction as represented by arrow 51, or any combination of two of these directions. In other words, by moving the handle 44 along dashed line 56, a linear movement toward the right side and forward or toward the left side and rearward can be commanded. Similarly, a linear movement along line 58 could be commanded. It should be understood that the operator of the marine vessel can also request a combination of sideways or forward/reverse linear movement in combination with a rotation as represented by arrow 54. Any of these possibilities can be accomplished through use of the joystick 30, which communicates with the controller 24 and eventually with the PCMs 26a, 26b. The magnitude, or intensity, of movement represented by the position of the handle 44 is also provided as an output from the joystick 30. In other words, if the handle 44 is moved slightly toward one side or the other, the commanded thrust in that direction is less than if, alternatively, the handle 44 was moved by a greater magnitude away from its vertical position with respect to the base portion 42. Furthermore, rotation of the handle 44 about axis 48, as represented by arrow 54, provides a signal representing the intensity of desired movement. A slight rotation of the handle 44 about axis 48 would represent a command for a slight rotational thrust about a preselected point on the marine vessel 10. On the other hand, a more intense rotation of the handle 44 about its axis 48 would represent a command for a higher magnitude of rotational thrust.

The joystick 30 can also provide information to the controller 24 regarding its being in an active state or an inactive state. While an operator is manipulating the joystick 30, the joystick 30 is in an active state. However, if the operator releases the joystick 30 and allows its handle 44 to return to a centered/upright and neutral position, the joystick 30 reverts to an inactive state. In one example, movement of the handle 44 away from the centered state or rotation of the handle 44 about its axis 48, or both, causes the controller 24 to determine that the joystick 30 is in the active state and to subsequently act on the commands from the joystick 30, regardless of the position of the throttle/shift levers 34 or steering wheel 32. In another example, either or both of the throttle/shift levers 34 and steering wheel 32 must be in a detent position before movement of the joystick 30 will result in the controller 24 determining that the joystick 30 is in the active state and subsequently acting on the commands from the joystick 30. In one example, the detent position of the throttle/shift levers 34 is a forward detent position or a neutral detent position. The detent position of the steering wheel 32 may be a zero-degree position. In another example, the transmissions 16a, 16b must both be in neutral before the joysticking mode can be enabled.

Thus, in a joysticking mode, the user may operate the joystick 30 to command the rotational and/or translational movements described herein above with respect to FIGS. 2 and 3. In another mode, the throttle/shift levers 34 and the steering wheel 32 can be used to send commands to the PCMs 26a, 26b via the controller 24 to operate the propulsion devices 12a, 12b in response to such commands, as is conventional to those having ordinary skill in the art. Further, the controller 24 may also be connected in signal communication with PCMs 26a, 26b in order to control the first and second propulsion devices 12a, 12b in an alternative autoheading mode such that the vessel 10 maintains a desired heading despite the presence of wind, waves, current, or other external factors force the vessel 10 off course. The autoheading function can be implemented, for example, by way of the operator of the marine vessel 10 specifying a desired heading angle with respect to due north using the keypad 28 or an interactive display on the operation console 22. Alternatively, the operator can activate the joystick 30 or steering wheel 32 to orient the marine vessel 10 in the direction of a desired heading and thereafter maintain this desired heading by selecting a heading maintenance button provided at the keypad 28. Alternatively, the operator could operate the marine vessel 10 in a waypoint tracking mode, in which the marine vessel 10 is propelled from one waypoint (geographical coordinate) to another at a heading calculated to reach the desired waypoint. A station keeping mode that maintains a desired global position and a desired heading of the marine vessel can also be activated in several ways. For example, the operator of the marine vessel 10 can actuate a button or switch on the keypad 28 that commands the controller 24 to maintain the current position of the vessel 10 whenever the switch is actuated. In one example, the station keeping mode is activated when the operator of the marine vessel 10 enables the station keeping mode and the joystick 30 is inactive. If the station keeping mode is enabled, but the joystick 30 is then manipulated by the operator of the marine vessel 10, the controller 24 may temporarily deactivate the station keeping mode because of the apparent desire of the operator to manipulate the vessel's position manually. However, as soon as the operator releases the joystick 30, return of the joystick 30 to the inactive state in combination with the enabled station keeping mode causes the system 20 to begin maintaining the new heading and position of the vessel 10.

In order to maintain the desired heading of the vessel 10, the controller 24 must have comparative information regarding the desired heading (input by the operator or calculated based on a desired waypoint) and the actual heading and/or course of the vessel. The controller 24 compares the actual heading and/or course of the vessel 10 detected by, for example, the IMU 36, with the desired heading input by the operator or calculated based on a desired waypoint. If for example, the difference between the desired heading and the actual heading and/or course exceeds a certain threshold value, the controller 24 may position the propulsion devices 12a, 12b and/or change the thrust provided by either of the propulsion devices 12a, 12b in order to correct and thereafter maintain the heading at the desired value. For example, the controller 24 can send a signal via the CAN bus to the PCMs 26a, 26b to set angles of rotation of the first and second propulsion devices 12a, 12b with respect to the marine vessel 10, to set engine speed, and/or to set shift position based on the required movement of the vessel 10 to achieve the desired heading.

Figure 4:
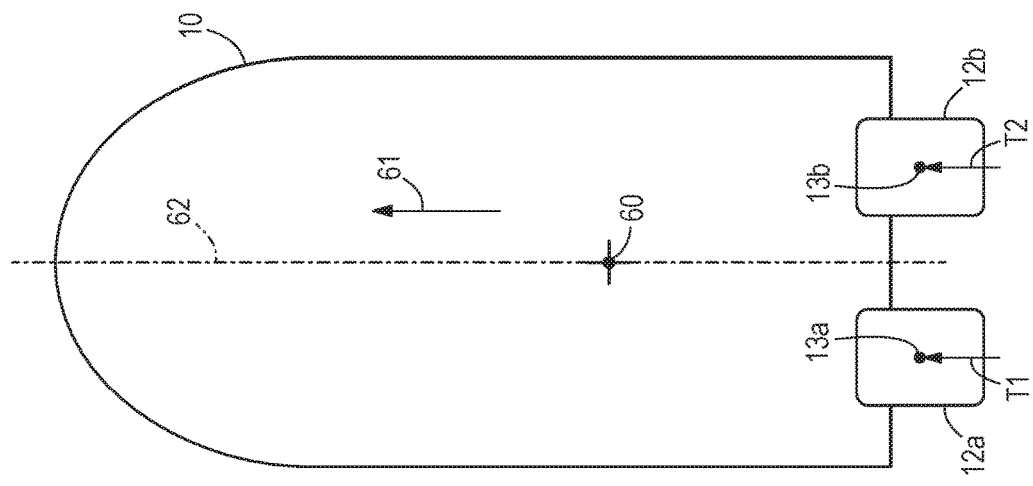
FIG. 4 illustrates an arrangement of thrust vectors during forward movement of the marine vessel.

In FIG. 4, the marine vessel 10 is illustrated schematically with its center of gravity 60, which can be a calibrated preselected point on the marine vessel 10. In other examples, point 60 could instead be an instantaneous center of turn. The center of turn is a function of several factors which comprise the speed of the vessel 10 as it moves through the water, the hydrodynamic forces on the hull of the marine vessel 10, the weight distribution of the load contained within the marine vessel 10, and the degree to which the vessel 10 is disposed below the waterline. The location of the center of turn can be empirically determined for various sets of conditions. For purposes of the below explanation, the point 60 will be referred to as the center of gravity, although similar calculations can be carried out using the center of turn.

First and second steering axes, 13a and 13b, are illustrated for the first and second propulsion devices 12a, 12b. The first and second propulsion devices 12a, 12b are rotatable about the first and second steering axes, 13a and 13b, respectively. The ranges of rotation of the first and second propulsion devices 12a, 12b may be symmetrical with respect to a centerline 62 of the vessel 10. The positioning method of the present disclosure rotates the first and second propulsion devices 12a, 12b about their respective steering axes 13a, 13b, adjusts their operation in forward or reverse gear, and adjusts the magnitude of their thrusts T1, T2 (for example, by adjusting engine speed and/or propeller pitch or transmission slip) in an efficient manner that allows rapid and accurate maneuvering of the marine vessel 10. The rotation, gear, and thrust magnitude of one propulsion device 12a can be varied independently of the rotation, gear, and thrust magnitude of the other propulsion device 12b.

FIG. 4 illustrates a thrust orientation that is used when it is desired to move the marine vessel 10 in a forward direction represented by arrow 61, with no movement in either a right or left direction and no rotation about its center of gravity 60. This is done by rotating the first and second propulsion devices 12a, 12b into an aligned position, in which their thrust vectors T1 and T2 are parallel to one another. As can be seen in FIG. 4, the first and second thrust vectors, T1 and T2, are equal in magnitude and are directed in the same forward direction. This creates no resultant rotation about the center of gravity 60 and no resultant movement in either the left or right directions. Movement in the direction represented by arrow 61 results from all of the vector components (described further herein below) of the first and second thrust vectors T1, T2 being resolved in a direction parallel to arrow 61. The resultant thrust components parallel to arrow 61 are additive and together provide net forward thrust in the direction of arrow 61 to the marine vessel 10.

Figure 5:
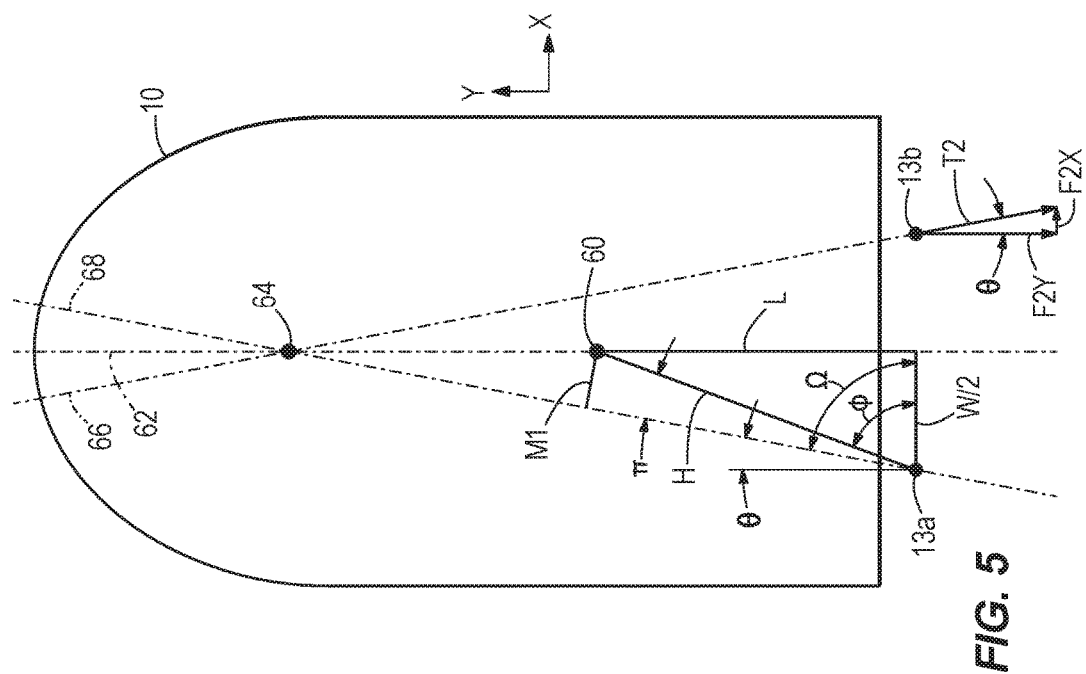
FIGS. 5 and 6 show arrangements of thrust vectors used to rotate the marine vessel about its center of gravity.
Figure 6:
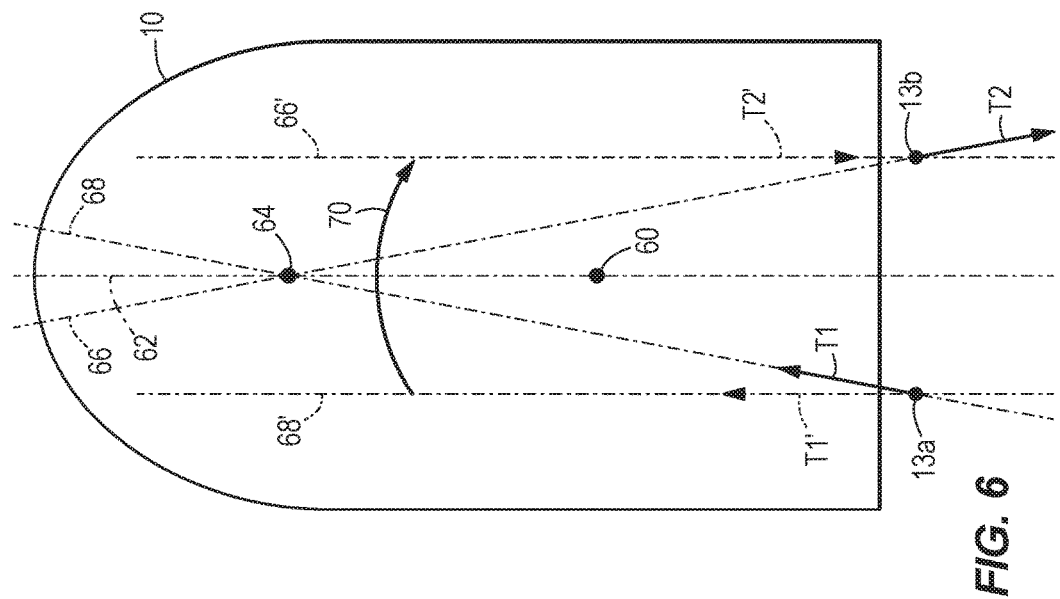
Figure 7:
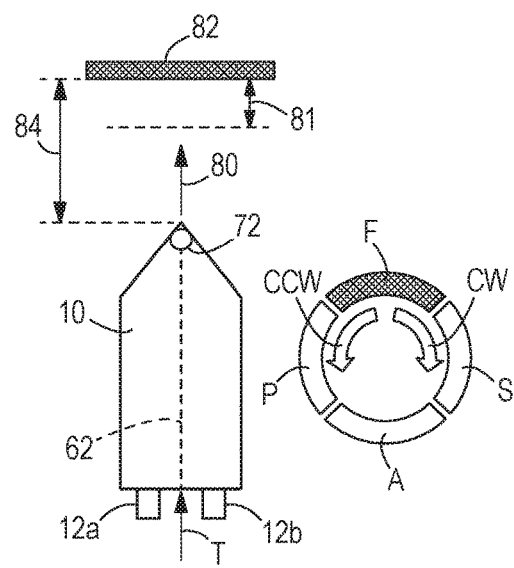
FIGS. 7-10 illustrate examples of the marine vessel near various objects.

As illustrated in FIGS. 5 and 6, when a rotation of the marine vessel 10 is desired in combination with linear movement, the first and second propulsion devices 12a, 12b are rotated about the respective first and second steering axes 13a, 13b to steering angles θ with respect to the centerline 62 so that their thrust vectors intersect at a point on the centerline 62. Although thrust vector T1 is not shown in FIG. 5 for purposes of clarity (see FIG. 6 for its magnitude and direction), its associated line of action 68 is shown intersecting with a line of action 66 of thrust vector T2 at a point 64. Because the point 64 is not coincident with the center of gravity 60, an effective moment arm M1 exists with respect to the thrust T1 produced by the first propulsion device 12a. The moment about the center of gravity 60 is equivalent to the magnitude of the thrust vector T1 multiplied by dimension M1. Moment arm M1 is perpendicular to dashed line 68 along which the first thrust vector T1 is aligned. As such, it is one side of a right triangle which also comprises a hypotenuse H. It should also be understood that another right triangle in FIG. 5 comprises sides L, W/2, and the hypotenuse H. So long as the propulsion devices 12a, 12b are rotated about their respective steering axes 13a, 13b by the same angle θ, a moment arm M2 (not shown for purposes of clarity) of equal magnitude to moment arm M1 would exist with respect to the second thrust vector T2 directed along line 66.

With continued reference to FIG. 5, those skilled in the art will recognize that the length of the moment arm M1 can be determined as a function of steering angle θ; angle Φ; angle π; the distance between the first and second steering axes 13a and 13b, which is equal to W in FIG. 5; and the perpendicular distance L between the center of gravity 60 and a line extending between the first and second steering axes 13a, 13b. The length of the line extending between the first steering axis 13a and the center of gravity 60 is the hypotenuse H of a right triangle and can easily be determined using the Pythagorean theorem given L and W, which are known and saved in the controller's memory. The magnitude of θ is calculated as described herein below with respect to equations 1-4. The magnitude of angle Ω is 90−θ. The magnitude of angle Φ is equivalent to the arctangent of the ratio of length L to the distance between the first steering axis 13a and the vessel's centerline 62, which is identified as W/2. The length of the moment arm M1 can be mathematically determined by the controller 24 using the length of line H and the magnitude of angle π (which is Ω−Φ).

The thrust vectors T1, T2 each resolve into vector components in both the forward/reverse and left/right directions. The vector components, if equal in absolute magnitude to each other, may either cancel each other or be additive. If unequal in absolute magnitude, they may partially offset each other or be additive; however, a resultant force will exist in some linear direction. For purposes of explanation, FIG. 5 shows the vector components of the second thrust vector T2. As illustrated, second thrust vector T2 is oriented along line 66, which is at steering angle θ with respect to the centerline 62. The second thrust vector T2 can be resolved into components, parallel and perpendicular to centerline 62, that are calculated as functions of the steering angle θ. For example, the second thrust vector T2 can be resolved into a reverse-directed force F2Y and a side-directed force F2X by multiplying the second thrust vector T2 by the cosine of θ and the sine of θ, respectively. The vector components of the first thrust T1 can also be resolved into forward/reverse and side directed components in a similar manner. Using these relationships, the vector components FX, FY of the net thrust produced by the marine propulsion system 20 can be calculated by adding the respective forward/reverse and left/right vector components of T1 and T2:

$$FX = T1(\sin(\theta)) + T2(\sin(\theta)) \quad (1)$$

$$FY = T1(\cos(\theta)) - T2(\cos(\theta)) \quad (2)$$

Note that in the example of FIGS. 5 and 6, T1 has positive vector components in both the X and Y directions, while T2 has a positive vector component in the X direction and a negative vector component in the Y direction, which is therefore subtracted from the Y-directed vector component of T1. The net thrust acting on the marine vessel 10 can be determined by vector addition of FX and FY.

Turning to FIG. 6, a moment (represented by arrow 70) can also be imposed on the marine vessel 10 to cause it to rotate about its center of gravity 60. The moment 70 can be imposed in either rotational direction: clockwise (CW) or counterclockwise (CCW). The rotating force resulting from the moment 70 can be applied either in combination with a linear force on the marine vessel 10 or alone. In order to combine the moment 70 with a linear force, the first and second thrust vectors T1, T2 are aligned in generally opposite directions with their respective lines of action 68, 66 intersecting at the point 64 illustrated in FIG. 6. Although the construction lines are not shown in FIG. 6, effective moment arms M1, M2 exist with respect to the first and second thrust vectors T1, T2 and the center of gravity 60. Therefore, a moment is exerted on the marine vessel 10 as represented by arrow 70. If the thrust vectors T1, T2 are equal to each other in magnitude, are exerted along lines 68 and 66 respectively, and are symmetrical about the centerline 62 and in opposite directions, the net component forces parallel to the centerline 62 are equal to each other and therefore no net linear force is exerted on the marine vessel 10 in the forward/reverse direction. However, the first and second thrust vectors T1, T2 also resolve into forces perpendicular to the centerline 62, which in this example are additive. As a result, the marine vessel 10 in FIG. 6 will move to the right as it rotates in a clockwise direction in response to the moment 70.

If, on the other hand, it is desired that the moment 70 be the only force on the marine vessel 10, with no lateral movement in the forward/reverse or left/right directions, alternative first and second thrust vectors, represented by T1' and T2' in FIG. 6, are aligned parallel to each other along dashed lines 68' and 66', which are parallel to the centerline 62. The first and second thrust vectors T1', T2' are of equal magnitude and opposite direction. As a result, no net force is exerted on the marine vessel 10 in a forward/reverse direction. Because angle θ for both thrust vectors T1' and T2' is equal to 0 degrees, no resultant force is exerted on the marine vessel 10 in a direction perpendicular to the centerline 62. As a result, a rotation of the marine vessel 10 about its center of gravity 60 is achieved with no linear movement in either the forward/reverse or the left/right directions.

With reference to FIGS. 2-6, it can be seen that movement of the joystick handle 44 can be used by the operator of the marine vessel 10 to represent virtually any type of desired movement of the marine vessel 10. In response to receiving a signal from the joystick 30, an algorithm determines whether or not a rotation (shown by moment 70) about the center of gravity 60 is requested by the operator. If forward translation with no rotation is requested, the first and second propulsion devices 12a, 12b are oriented so that their thrust vectors align in a forward parallel orientation, as shown in FIG. 4, and so long as the magnitude and direction of T1 are equal to that of T2, the marine vessel 10 will travel in a forward direction. If, on the other hand, the signal from the joystick 30 indicates that a rotation about the center of gravity 60 is requested, the first and second thrust vectors T1, T2 are directed along lines 68 and 66 that do not intersect at the center of gravity 60, but instead intersect at another point 64 along the centerline 62. As shown in FIGS. 5 and 6, this intersection point 64 can be forward from the center of gravity 60. The thrusts T1 and T2 shown in FIG. 6 result in a clockwise rotation (shown by moment 70) of the marine vessel 10. Alternatively, if the first and second propulsion devices 12a, 12b are rotated so that they intersect at a point along the centerline 62 that is behind the center of gravity 60, an opposite effect could be realized, all else being equal. It should also be recognized that, with an intersection point 64 forward of the center of gravity 60, the directions of the first and second thrust vectors T1, T2 could be reversed to cause a rotation of the marine vessel 10 in a counterclockwise direction.

It should be noted that the steering angles of the propulsion devices 12a, 12b need not be the same. For example, the first propulsion device 12a can be steered to angle $\theta_1$ with respect to the centerline 62, while the second propulsion device 12b can be steered to angle $\theta_2$. When an input to the joystick 30 is made, the controller 24 will determine the net thrust and the net moment desired of the propulsion system 20 based on a map stored in the memory that correlates a given joystick input with a target linear thrust and a target moment about a preselected point. It can be seen, therefore, that T1, T2, $\theta_1$, and $\theta_2$ can thereafter be calculated by the controller 24 using the geometric relationships described hereinabove according to the following equations:

$$FX = T1(\sin(\theta_1)) + T2(\sin(\theta_2)) \tag{1}$$

$$FY = T1(\cos(\theta_1)) - T2(\cos(\theta_2)) \tag{2}$$

$$MCW = (W/2)(T1(\cos(\theta_1))) + (W/2)(T2(\cos(\theta_2))) \tag{3}$$

$$MCCW = L(T1(\sin(\theta_1))) + L(T2(\sin(\theta_2))) \tag{4}$$

$$MT = MCW - MCCW \tag{5}$$

where FX and FY are the vector components of the known target linear thrust, MT is the known total target moment (including clockwise moment MCW and counterclockwise moment MCCW) about the preselected point, and L and W/2 are also known as described above. The controller 24 then solves for the four unknowns (T1, T2, $\theta_1$, and $\theta_2$) using the four equations, thereby determining the steering angles, shift positions, and thrust magnitudes of each propulsion device 12a, 12b that will achieve the desired movement of the marine vessel 10. Note that equations 1-5 are particular to the thrust arrangements shown in FIGS. 5 and 6, and different vector components would contribute to clockwise or counterclockwise rotation and to forward/reverse or right/left translation given thrusts in different directions.

The above principles regarding resolution of the thrust vectors T1, T2 into X components and Y components in order to achieve lateral movement, rotational movement, or a combination of the two are the basis of a maneuvering algorithm of the present method. Not only is this maneuvering algorithm used in response to commands from the joystick 30 while in joysticking mode, it is also used to control rotational position, shift position, and thrust magnitude of the propulsion devices 12a, 12b while the vessel 10 operates in the station keeping mode. In other words, the controller 24 makes automatic corrections to each of these variables to maintain the vessel's heading and position while in station keeping mode in the same manner as if the operator were in fact manipulating the joystick to make such corrections. Similar methods could be used while in the autoheading or waypoint tracking modes described herein above.

Returning for a moment to FIG. 1, the marine vessel 10 can also be provided with one or more sensors 72, 74, 76, and 78. Although one sensor is shown on each of the bow, stern, and port and starboard sides of the marine vessel 10, fewer or more sensors could be provided at each location. The sensors 72-78 are distance and directional sensors. For example, the sensors could be radars, sonars, cameras, lasers, Doppler direction finders, or other devices individually capable of determining both the direction and distance of an object O near the marine vessel 10, such as a dock, seawall, slip, large rock or tree, etc. Alternatively, separate sensors could be provided for sensing direction than are provided for sensing distance, or more than one type of distance/direction sensor can be provided at a single location on the vessel 10. The sensors 72-78 provide information regarding both a direction of the object with respect to the marine vessel 10 and a shortest distance between the object O and the marine vessel 10. The sensors 72-78 provide this distance and direction information to the controller 24, such as by way of the CAN bus or wireless connections, as described herein above.

FIGS. 7-10 show various situations in which the marine vessel 10 is approaching an object, such as a slip, dock, or sea wall. Often times, because of the precise control over translational and rotational movement of the marine vessel 10 provided in the joysticking mode, an operator will use the joysticking mode when approaching such objects in order to position the marine vessel 10 in a desired position with respect to the object without making contact with the object. Additionally, once the operator has achieved a desired position with respect to the object, the operator may place the marine vessel 10 in the station keeping mode, thereby causing the marine vessel 10 to maintain its position and heading while proximate the object. However, either due to operator error while in the joysticking mode; due to disturbances caused by wind, current, and/or waves; or due to inherent error in the GPS system 38 that provides information for the station keeping mode, the marine vessel 10 may nonetheless come too close to the object, which can result in damage to the vessel 10. Therefore, the present disclosure contemplates a method in which information from the distance and direction sensors 72-78 is used by the controller 24 to compare a desired movement of the marine vessel 10 with a shortest distance between the object and the marine vessel 10 and a direction of the object with respect to the marine vessel, and thereafter to select whether to command the marine propulsion system 20 to generate thrust to achieve the desired movement, or alternatively whether to command the marine propulsion system 20 to generate thrust to achieve a modified movement that ensures the marine vessel 10 will not contact the object. In one example, the method includes ensuring that the marine vessel 10 maintains at least a predetermined range R from the object O. See FIG. 1.

Figure 11:
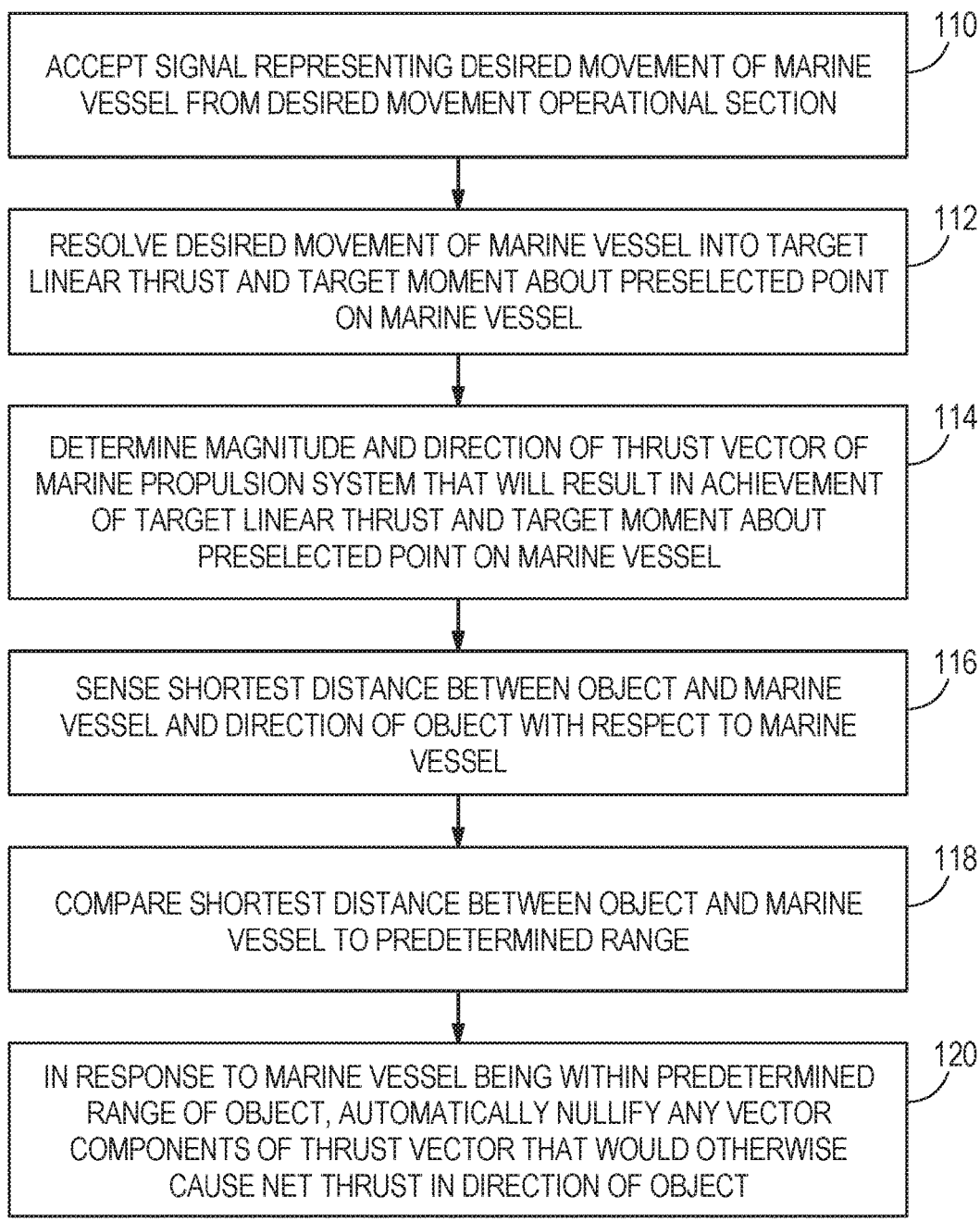
FIGS. 11 and 12 illustrate methods according to the present disclosure for maneuvering marine vessels near objects.

More specifically, referring to FIGS. 1 and 11, the method may include accepting with the controller 24 a signal representing a desired movement of the marine vessel 10 from a desired movement operational section 29, as shown at box 110. In one example, the desired movement operational section 29 is the joystick 30. In another example, the desired movement operational section 29 is the keypad 28, which enables the station keeping mode. Next, as shown at box 112, the method includes resolving a desired movement of the marine vessel 10 into a target linear thrust and a target moment about a preselected point on the marine vessel 10. For example, the preselected point may be the vessel's center of gravity 60, although other points of interest such as the instantaneous center of turn could be calculated on the fly or could be calibrated into the system, as described hereinabove. For purposes of describing the operation of the present method, it will be presumed that the location of the center of turn or the location of the center of gravity 60 is known by the software operating within a processor of the controller 24. The controller 24 can use a lookup table or other input-output map to find the target linear thrust and a target moment corresponding to a particular input from the desired movement operational section 29.

As shown at box 114, the method includes determining a magnitude and a direction of a thrust vector of the marine propulsion system that will result in achievement of the target linear thrust and the target moment about the preselected point on the marine vessel 10. For example, this may include determining the steering angles and magnitudes for the two propulsion devices 12a, 12b in order to result in the desired net thrust and desired net moment using equations 1-5 as described hereinabove with respect to FIGS. 4-6. In another example, only one marine propulsion device may be provided, and its thrust vector would constitute the net thrust in and of itself. If more than two marine propulsion devices are provided, the same principles described above can be used to solve for each propulsion device's steering angle and thrust magnitude. The controller 24 can thereby determine the magnitudes and directions of each individual thrust vector from each individual propulsion device that will add up to a desired net thrust and a desired net moment given the target linear thrust and the target moment input via the joystick 30 or the station keeping section of the system 20.

The method next includes, as shown at 116, sensing with a sensor 72, 74, 76, 78 a shortest distance between the object O and the marine vessel 10 and a direction of the object O with respect to the marine vessel 10. For example, referring to FIG. 7, the sensor 72 may sense the shortest distance 84 between the marine vessel 10 and the object 82. The sensor 72 may also sense the direction 80 of the object 82 as being directly forward with respect to the marine vessel 10. As shown at box 118, the controller 24 then compares the shortest distance 84 between the object 82 and the marine vessel 10 to a predetermined range 81. This predetermined range 81 may be calibrated and stored in a memory of the controller 24 for use by the present maneuvering algorithm. In other examples, the predetermined range 81 may depend on the speed of the marine vessel 10 or the mode in which the system 20 is operating, and may be determined from a lookup table or similar input/output map. In still other examples, the operator could input a desired predetermined range via the keypad 28 or other interactive display located at the operation console 22.

As shown at box 120, in response to the marine vessel 10 being within the predetermined range 81 of the object 82 (i.e., at the predetermined range or closer to the object than the predetermined range), the controller 24 automatically nullifies any vector components of the thrust vector that would otherwise cause net thrust in the direction 80 of the object 82. As shown by the schematic to the right of the marine vessel 10 in FIG. 7, the marine propulsion system 20 may therefore generate thrust in the starboard direction as indicated by the area S, the aft direction as indicated by the arrow A, the port direction as indicated by the area P or in either of the yaw directions as indicated by the arrows CW and CCW, but may not generate net thrust in the fore direction as indicated by the area F. Effectively, the controller 24 will not relay any forwardly-oriented net thrust command to the PCMs 26a, 26b for action thereupon. In this example, in which the target net thrust T is oriented only in the fore direction, the controller 24 will not command any net thrust from the marine propulsion system 20 once the vessel 10 is within the predetermined range of the object 82.

Note that other desired directions input to the controller 24, either by way of the joystick 30 or from the station keeping section of the system 20, will be acted upon so long as they do not bring the vessel 10 within the predetermined range 81 of the object 82. In other words, in response to the marine vessel 10 being within the predetermined range 81 of the object 82, the method further comprises generating any vector components of the thrust vector that do not cause net thrust in the direction 80 of the object 82. For example, referring briefly to FIG. 7, if the object 82 is in front of the marine vessel 10, the marine propulsion system 20 may be able to produce a net thrust to the left or right (if one is commanded), but it is not allowed to produce a net thrust in the forward Y direction. Note that if two marine propulsion devices 12*a*, 12*b* are provided, either one may be allowed to produce an individual thrust in the Y direction; however, the net forward thrust in the Y direction must be 0. Thus, a vector component of the individual thrust T1 or T2 produced by one of the propulsion devices 12*a*, 12*b* can be oriented in the fore direction, so long as the other propulsion device produces a thrust component in the aft direction to nullify or counteract such fore-directed thrust. In another example, the controller 24 may prevent any thrust vector components at all from being oriented in the direction 80 of the object 82.

Because the controller 24 does not prohibit all movement whatsoever in response to a signal from the desired movement operational section 29, but only movement in the direction of the object, the controller 24 can calculate the thrusts that will be provided according to equations 1-4 above. For example, if a net thrust in the fore direction is prohibited, the controller 24 may set FY=0, while the FX, MCW, and MCCW equations remain set to the values mapped from the input to the desired movement operational section 29. The controller 24 can then solve for T1, T2, $\theta_1$, and $\theta_2$ and subsequently send signals to the PCMs 26*a*, 26*b* to produce such thrusts at such angles, resulting in a modified net thrust that partially accomplishes the input target linear thrust and target moment, although it does not move the vessel 10 in the direction of the object.

In contrast, in response to the marine vessel 10 being beyond (outside) the predetermined range of the object 82, the method comprises generating the thrust vector that will result in achievement of the target linear thrust and the target moment about the preselected point on the marine vessel 10. In other words, using the example of FIG. 7, so long as the marine vessel 10 is not too close to the object 82, as sensed by the sensor 72, the marine vessel 10 will be allowed to move in the fore direction 80. The controller 24 in this instance calculates T1, T2, $\theta_1$, and $\theta_2$ according to equations 1-4 by setting FX, FY, MCW, and MCCW to the values mapped from the desired movement operational section 29. Meanwhile, the sensor 72 will continue to sense the shortest distance between the object 82 and the marine vessel 10, and will continue to compare the distance 84 between the object 82 and the marine vessel 10 to the predetermined range 81. Once the marine vessel 10 comes within the predetermined range 81 of the object 82, the controller 24 will prevent further forward motion.

Figure 8:
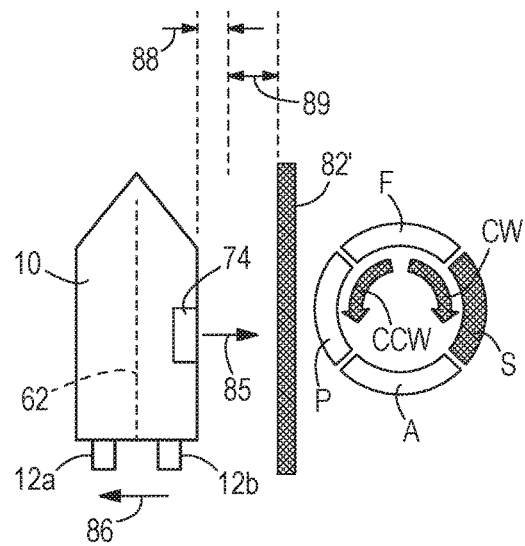

Note that due to provision of sensors in numerous locations, the marine vessel 10 does not only sense objects in front of it, but also on its sides. For example, as shown in FIG. 8, the sensor 74 may be able to sense an object 82' to the starboard side of the vessel 10. Note that in this example, the direction of the object 82' with respect to the marine vessel 10 is to the right. Thus, the prohibited vector component of the net thrust vector is in the starboard direction 85, as shown by area S in the schematic in FIG. 8. Once the sensor 74 determines that the marine vessel 10 is within a predetermined range 89 of the object 82' in the starboard direction 85, the controller 24 will automatically prohibit the marine propulsion system 20 from generating thrust in the starboard direction 85. Rotation of the marine vessel 10 in the clockwise direction as shown by the arrow CW or in the counterclockwise direction as shown by the arrow CCW may also be prohibited, especially if additional sensors are provided on the starboard side of the vessel 10, closer to the bow and/or stern, in order to sense if and when the starboard bow nears the object 82' or the starboard stern nears the object 82'. In other words, in response to the marine vessel 10 being within the predetermined range 89 of the object 82', the controller 24 automatically nullifies any vector components of the thrust vector that would otherwise cause the marine vessel 10 to yaw such that any portion of the marine vessel 10 would not maintain the predetermined range 89 from the object 82'. The controller 24 could do so by setting MCW and MCCW in equations 3 and 4 to zero. However, as shown by the schematic in FIG. 8, the marine vessel 10 may still generate a net thrust in the fore direction as shown by area F, the aft direction as shown by area A, and/or the port direction as shown by area P.

Oftentimes, by the time a sensor, such as sensor 74, has determined that the marine vessel 10 is within the predetermined range 89 of an object, such as object 82', it is too late to stop the marine vessel 10 from contacting the object 82' merely by preventing further net thrust in the direction 85 of the object 82'. Thus, the system of the present disclosure is also programmed to take reverse control action once the marine vessel 10 comes within a given distance of the predetermined range from the object. For example, the present method may include generating net thrust in a direction 86 that is opposite the direction 85 of the object 82' in response to the marine vessel 10 coming within a given distance 88 of the predetermined range 89 from the object 82'. The controller 24 can calculate the thrusts and steering angles required to provide such reverse control action by setting FX, FY, MCW, or MCCW (as appropriate) equal to a desired value opposite in sign to what it had previously been before the vessel 10 came within the given distance 88 of the predetermined range 89. The given distance 88 may be calibrated and saved in the controller's memory, looked up based on current operating conditions of the marine vessel 10, or entered by the operator via an input device. In one example, a magnitude of the net thrust in the opposite direction 86 is based on speed at which the marine propulsion system 20 was operating as the marine vessel 10 came within the given distance 88 of the predetermined range 89 from the object 82'. For example, the magnitude of the net thrust in the opposite direction 86 can be based on the speed of the marine vessel 10 or the speed of the engines 14*a*, 14*b*. In other examples, the magnitude of the net thrust in the opposite direction 86 is calibrated and saved into the controller's memory and does not change based on the vessel operating conditions.

The method may also include commanding the marine propulsion system 20 to generate net thrust in the opposite direction 86 for a period of time that depends on a momentum of the marine vessel 10 as the marine vessel 10 came within the given distance 88 of the predetermined range 89 from the object 82'. Because momentum depends on both speed and mass, the period of time may therefore also or instead be determined based on the vessel speed or the engine speed. However, if the mass of the vessel 10 is known, (ostensibly without extra weight such as cargo or humans) this can also be factored in to determine how long to generate the net thrust in opposite direction 86. The momentum may also be used to determine the magnitude of net thrust in the opposite direction 86, similar to how speed is used to determine this value as disclosed hereinabove. Note that the controller 24 may also command the marine propulsion system 20 to generate net thrust in the opposite direction 86 in response to the marine vessel 10 coming within the given distance 88 of the predetermined range 89 from the object 82', even when no signal from the desired movement operational section 29 is received. This provides a sort of pseudo-station keeping method, in which the marine vessel 10 is maintained at a safe distance from the object 82', even when the user is not manipulating the joystick 30 or the station keeping section is not providing corrective commands to maintain the marine vessel 10 at a given position and heading.

Figure 9:
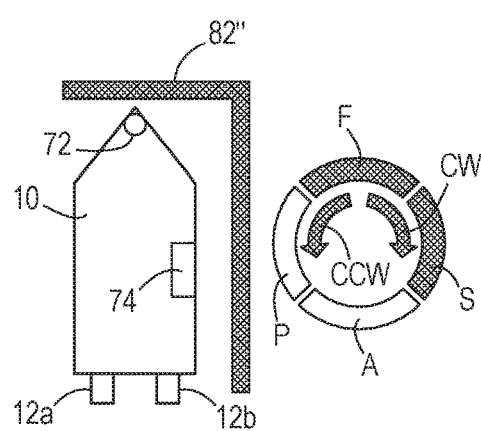

Referring to FIG. 9, note that both the sensors 72 and 74 can be used together to ensure that the marine vessel 10 remains at a safe distance (predetermined range) from object 82". For example, sensor 72 may note when the marine vessel 10 comes within the predetermined range of the object 82" and the controller 24 may thereafter prevent further net thrust in the fore direction, as indicated by the area F in the schematic. The controller 24 may also prevent further net thrust in the starboard direction, as indicated by the area S, based on information from the sensor 74. The two sensors 72, 74 together may also prevent yaw movements in the counterclockwise and clockwise directions, as indicated by the arrows CCW and CW. However, because no object is sensed to the port or aft sides of the marine vessel 10, the controller 24 will allow the marine propulsion system 20 to produce net thrust in either or both of these directions. This is indicated by the clear state of the areas marked A and P in the schematic.

Figure 10:
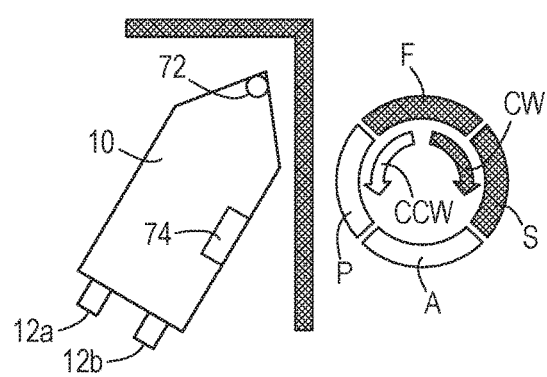

FIG. 10 shows a situation in which the operator of the marine vessel 10 is maneuvering the vessel 10 such that it is not parallel or perpendicular to the object 82". Note that in this situation, the information from the sensors 72 and 74 will disallow movements in the fore direction as indicated by area F, in the starboard direction as indicated by the area S, and yaw movements in the clockwise direction, as indicated by the arrow CW. However, movements to port, aft, and in the counterclockwise direction are all allowed, as indicated by these areas being clear in the schematic in FIG. 10. Note that various other prohibitions and allowances of net thrust directions are possible, depending on the relative position and distance of the marine vessel 10 with respect to the object. For example, a translation input with a yaw input from the joystick 30 could result in part of the vessel 10 arriving at the object 82", while the remainder of the vessel 10 is skewed from the object's surface, as shown here. Any translational command to the right within the predetermined range would be nullified by the controller 24 (i.e., negated with an equal and opposite thrust vector to bring momentum to a zero state), but the CCW yaw command could still be acted upon, thereby bringing the starboard side of the vessel 10 essentially parallel to the object's surface. Such automatic continuous collision avoidance would allow the operator to dock without damaging the vessel 10, despite inputs via the joystick 30 that would otherwise cause a collision.

Initiation of the maneuvering algorithm of the present disclosure that disallows net thrust in the direction of an object with respect to which the marine vessel is dangerously close may be by way of a user selecting a button from the keypad 28 that enables the algorithm. Alternatively, the maneuvering algorithm may be automatically enabled based upon a speed threshold. For example, the method may include confirming that the marine propulsion system 20 is operating below a predetermined speed threshold before enabling the maneuvering algorithm, and/or before automatically nullifying any vector components of the thrust vector that would otherwise cause net thrust in the direction of a sensed object. Alternatively, the maneuvering algorithm may be automatically initiated any time a particular mode is enabled. The method may therefore include confirming that the marine propulsion system 20 is operating in a given mode before automatically nullifying any vector components of the thrust vector that would otherwise cause net thrust in the direction of the object. For example, the given mode may be a joysticking mode or a station keeping mode.

Note that the maneuvering algorithm of the present disclosure includes a continuous collision avoidance algorithm in which, even after the operator has removed his hand from the joystick 30, the sensors 72-78 continue to sense proximity of the marine vessel 10 with respect to the object, and, if necessary, generate net thrust in a direction opposite that of the object in order to maintain the predetermined range between the two if the marine vessel 10 is determined as the moving entity (e.g., by way of a vessel speed sensor or a gear state sensor). Note also that the joysticking and station keeping modes are not the only modes utilizable with the present method. For example, the present method could also be used while in a waypoint mode, in which the operator selects a desired spot on a map/chartplotter to which he wishes the marine vessel 10 to move. This could be done via an interactive display at the operation console 22. The marine vessel 10 would thereafter be automatically maneuvered to that spot, and once the vessel 10 came within the given distance of the predetermined range or within the predetermined range of the object, as applicable, the maneuvering algorithm of the present disclosure would prevent any collision. Gradual state transitions with proportionality between a state in which the marine vessel 10 is moving toward the object and a state in which reverse thrust away from the object is created will allow a smooth transition between carrying out commands originating from the operator or station keeping section and automatic reverse control action according to the present maneuvering algorithm. Note, however, that the present maneuvering algorithm does not output commands that are calculated based on determined distances to fixed points, but rather includes an algorithm in which the controller 24 determines whether to output a certain command based on an input from a desired movement operational section 29 and a direction and proximity of an object O with respect to the marine vessel 10. Note that when maneuvering near an object having a curved or irregular surface, the present algorithm can use a "best fit" method to maintain a given distance from the nearest or more prominent surfaces of the object.

Regarding the sensors, 72, 74, 76, 78, note that different types of sensors may be used depending on the distance between the marine vessel 10 and the object 82. For example, radar sensors may be used at further distances. Once the marine vessel 10 comes within a particular distance of the object, Lidar, ultrasonic, Leddar, or sonar sensors may instead be used. Camera sensors may be used in combination with any of the sensors mentioned above in order to provide additional information to the controller 24. Note that the sensors should be placed at optimal positions on the marine vessel 10 in order that they are at the correct height to detect objects the marine vessel 10 is likely to encounter. Note also that the controller 24 may select one of a plurality of sensors (including radars, Lidars, Leddars, sonics, and cameras) with which to sense the shortest distance and the direction of the object with respect to the marine vessel based on a previously saved actual distance that was measured between the object and the marine vessel. This way, the controller 24 knows which type of sensor is best for the next measurement.

Figure 12:
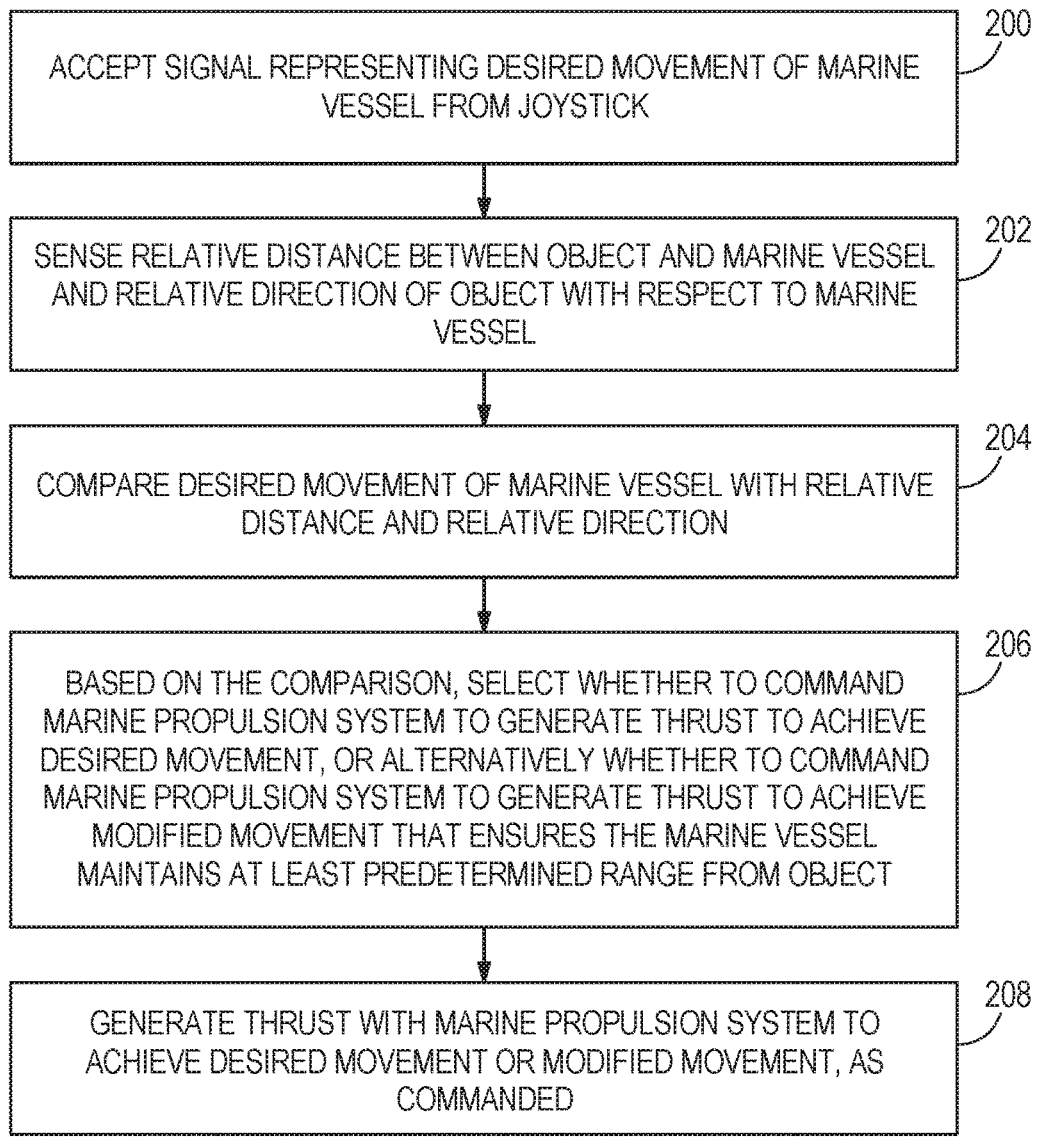

Turning to FIG. 12, an additional method for controlling movement of a marine vessel near an object will be disclosed. As shown at 200, the method includes accepting, with a controller 24, a signal representing a desired movement of the marine vessel 10 from a joystick 30. As shown at box 202, the method includes sensing, with a sensor 72, 74, 76, 78, a shortest distance between the object O and the marine vessel 10 and a direction of the object O with respect to the marine vessel 10. The method next includes, as shown at box 204, comparing the desired movement of the marine vessel with the shortest distance and the direction. This can be done by the controller 24. Next, as shown at box 206, the controller 24 selects, based on the comparison, whether to command the marine propulsion system 20 to generate thrust to achieve the desired movement, or alternatively whether to command the marine propulsion system 20 to generate thrust to achieve a modified movement that ensures the marine vessel 10 maintains at least a predetermined range R from the object O. Finally, the method includes, as shown at box 208, generating net thrust with the marine propulsion system 20 to achieve the desired movement or the modified movement, as commanded.

The method may also include, as described herein above, resolving the desired movement of the marine vessel 10 into a target linear thrust and a target moment about a preselected point on the marine vessel 10 and determining a magnitude and a direction of a thrust vector of the marine propulsion system 20 that will result in achievement of the target linear thrust and the target moment about the preselected point on the marine vessel 10. The controller 24 may compare the shortest distance between the object O and the marine vessel 10 to the predetermined range R. In response to the marine vessel 10 being within the predetermined range R of the object O, the controller 24 automatically nullifies any vector components of the thrust vector that would otherwise cause net thrust in the direction of the object and automatically nullifies any vector components of the thrust vector that would otherwise cause the marine vessel 10 to yaw such that any portion of the marine vessel 10 would not maintain the predetermined range R from the object O.

In the above description certain terms have been used for brevity, clarity and understanding. No unnecessary limitations are to be implied therefrom beyond the requirement of the prior art because such terms are used for descriptive purposes only and are intended to be broadly construed. The different systems and methods described herein above may be used in alone or in combination with other systems and methods. Various equivalents, alternatives and modifications are possible within the scope of the appended claims. While each of the method claims includes a specific series of steps for accomplishing certain control system functions, the scope of this disclosure is not intended to be bound by the literal order or literal content of steps described herein, and non-substantial differences or changes still fall within the scope of the disclosure.

What is claimed is:

1. A method for controlling movement of a marine vessel near an object, the marine vessel being propelled by thrust generated by a marine propulsion system according to commands from a controller, the method comprising:
   accepting, with the controller, a signal representing a desired movement of the marine vessel from a desired movement operational section;
   resolving the desired movement of the marine vessel into a target linear thrust and a target moment about a preselected point on the marine vessel;
   determining a magnitude and a direction of a thrust vector of the marine propulsion system that will result in achievement of the target linear thrust and the target moment about the preselected point on the marine vessel;
   sensing, with a sensor, a shortest distance between the object and the marine vessel and a direction of the object with respect to the marine vessel; and
   with the controller, comparing the shortest distance between the object and the marine vessel to a predetermined range;
   wherein in response to the marine vessel being within the predetermined range of the object, the controller automatically nullifies any vector components of the thrust vector that would otherwise cause net thrust in the direction of the object.

2. The method of claim 1, wherein in response to the marine vessel being within the predetermined range of the object, the controller automatically nullifies any vector components of the thrust vector that would otherwise cause the marine vessel to yaw such that any portion of the marine vessel would not maintain the predetermined range from the object.

3. The method of claim 2, wherein in response to the marine vessel being beyond the predetermined range of the object, the method comprises generating the thrust vector that will result in achievement of the target linear thrust and the target moment about the preselected point on the marine vessel.

4. The method of claim 2, wherein in response to the marine vessel being within the predetermined range of the object, the method further comprises generating any vector components of the thrust vector that do not cause net thrust in the direction of the object.

5. The method of claim 3, further comprising generating thrust that will result in achievement of the target linear thrust and the target moment about the preselected point on the marine vessel as long as the marine vessel is beyond the predetermined range of the object, and meanwhile continuing to sense the shortest distance between the object and the marine vessel and continuing to compare the shortest distance to the predetermined range.

6. The method of claim 1, further comprising generating net thrust in a direction that is opposite the direction of the object in response to the marine vessel coming within a given distance of the predetermined range from the object.

7. The method of claim 6, further comprising determining a magnitude of net thrust in the opposite direction based on a speed at which the marine propulsion system was operating as the marine vessel came within the given distance of the predetermined range from the object.

8. The method of claim 6, further comprising generating net thrust in the opposite direction for a period of time that depends on a momentum of the marine vessel as the marine vessel came within the given distance of the predetermined range from the object.

9. The method of claim 6, further comprising generating net thrust in the opposite direction in response to the marine vessel coming within the given distance of the predetermined range from the object, even when no signal from the desired movement operational section is received.

10. The method of claim 1, further comprising confirming that the marine propulsion system is operating in a given mode before automatically nullifying any vector components of the thrust vector that would otherwise cause net thrust in the direction of the object.

11. The method of claim 1, further comprising confirming that the marine propulsion system is operating below a predetermined speed threshold before automatically nullifying any vector components of the thrust vector that would otherwise cause net thrust in the direction of the object.

12. A method for controlling movement of a marine vessel near an object, the marine vessel being propelled by thrust generated by a marine propulsion system, the method comprising:
- accepting, with a controller, a signal representing a desired movement of the marine vessel from a joystick;
- sensing, with a sensor, a shortest distance between the object and the marine vessel and a direction of the object with respect to the marine vessel;
- with the controller, comparing the desired movement of the marine vessel with the shortest distance and the direction;
- based on the comparison, selecting with the controller whether to command the marine propulsion system to generate thrust to achieve the desired movement, or alternatively whether to command the marine propulsion system to generate thrust to achieve a modified movement that ensures the marine vessel maintains at least a predetermined range from the object; and
- generating thrust with the marine propulsion system to achieve the desired movement or the modified movement, as commanded.

13. The method of claim 12, further comprising:
- resolving the desired movement of the marine vessel into a target linear thrust and a target moment about a preselected point on the marine vessel;
- determining a magnitude and a direction of a thrust vector of the marine propulsion system that will result in achievement of the target linear thrust and the target moment about the preselected point on the marine vessel; and
- with the controller, comparing the shortest distance between the object and the marine vessel to the predetermined range;
- wherein in response to the marine vessel being within the predetermined range of the object, the controller automatically nullifies any vector components of the thrust vector that would otherwise cause net thrust in the direction of the object and automatically nullifies any vector components of the thrust vector that would otherwise cause the marine vessel to yaw such that any portion of the marine vessel would not maintain the predetermined range from the object.

14. The method of claim 13, wherein in response to the marine vessel being beyond the predetermined range of the object, the method comprises generating the thrust vector that will result in achievement of the target linear thrust and the target moment about the preselected point on the marine vessel.

15. The method of claim 13, wherein in response to the marine vessel being within the predetermined range of the object, the method further comprises generating any vector components of the thrust vector that do not cause net thrust in the direction of the object.

16. The method of claim 13, further comprising generating net thrust in a direction that is opposite the direction of the object in response to the marine vessel coming within a given distance of the predetermined range from the object.

17. The method of claim 16, further comprising determining a magnitude of net thrust in the opposite direction and a period of time for which to generate net thrust in the opposite direction based on a speed at which the marine propulsion system was operating as the marine vessel came within the given distance of the predetermined range from the object.

18. The method of claim 12, further comprising confirming that the marine propulsion system is operating in a given mode before generating thrust with the marine propulsion system to achieve the modified movement.

19. The method of claim 18, wherein the given mode is a joysticking mode.

20. The method of claim 12, further comprising selecting one of a plurality of sensors with which to sense the shortest distance and the direction based on a previously saved actual distance between the object and the marine vessel.

* * * * *